(12) United States Patent
Nara

(10) Patent No.: US 8,514,405 B2
(45) Date of Patent: Aug. 20, 2013

(54) TRACKING TYPE LASER GAUGE INTERFEROMETER WITH ROTATION MECHANISM CORRECTION

(75) Inventor: Masayuki Nara, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 336 days.

(21) Appl. No.: 12/884,700

(22) Filed: Sep. 17, 2010

(65) Prior Publication Data

US 2011/0069319 A1 Mar. 24, 2011

(30) Foreign Application Priority Data

Sep. 18, 2009 (JP) ................. 2009-216426

(51) Int. Cl.
*G01B 11/02* (2006.01)
(52) U.S. Cl.
USPC .......................................... 356/498; 356/493
(58) Field of Classification Search
USPC .................................................. 356/450–521
See application file for complete search history.

(56) References Cited

U.S. PATENT DOCUMENTS

| | | | | |
|---|---|---|---|---|
| 4,714,339 | A * | 12/1987 | Lau et al. ............... | 356/4.09 |
| 7,800,758 | B1 * | 9/2010 | Bridges et al. .......... | 356/482 |
| 2003/0020895 | A1 | 1/2003 | Bridges | |
| 2007/0024861 | A1 * | 2/2007 | Yanaka et al. .......... | 356/498 |
| 2008/0259311 | A1 * | 10/2008 | Nara ....................... | 356/4.01 |
| 2008/0316497 | A1 * | 12/2008 | Taketomi et al. ....... | 356/498 |

FOREIGN PATENT DOCUMENTS

| | | |
|---|---|---|
| EP | 1750085 | 2/2007 |
| EP | 1895266 | 3/2008 |
| JP | 7-120213 | 5/1995 |

OTHER PUBLICATIONS

Pek Loo Teoh, et al., "The Measurement Uncertainties in the Laser Interferometry-Based Sensing and Tracking Technique", Measurement, Institute of Measurement and Control. London, GB, vol. 32, No. 2, Sep. 1, 2002, pp. 135-150, XP004367624, ISSN: 0263-2241, DOI: 10.1016/S0263-2241(02)00006-4.

* cited by examiner

*Primary Examiner* — Tarifur Chowdhury
*Assistant Examiner* — Michael P Lapage
(74) *Attorney, Agent, or Firm* — Rankin, Hill & Clark LLP

(57) ABSTRACT

A tracking type laser gauge interferometer includes: a first recursive reflector configured to reflect light parallel to incident light; a second recursive reflector attached to a measurement object; a main body part configured to guide light emitted from a laser light source to the first recursive reflector; a rotating mechanism configured to rotate the main body part; and a control unit configured to control the rotating mechanism based on the light emergent from the main body part and reflected at the second recursive reflector, wherein: the main body part includes a light receiving element configured to receive the light reflected at the first recursive reflector and detect a position of the received light; and the control device includes: an angle acquisition unit configured to acquire a rotational angle of the rotating mechanism; and an correction unit configured to correct a motion error of the rotating mechanism.

5 Claims, 3 Drawing Sheets

TRACKING TYPE LASER GAUGE INTERFEROMETER WITH ROTATION MECHANISM CORRECTION

CROSS-REFERENCE TO RELATED APPLICATION(S)

This application is based upon and claims the benefit of priority from Japanese Patent Application No. 2009-216426, filed on Sep. 18, 2009, the entire contents of which are incorporated herein by reference.

BACKGROUND

1. Field of the Invention

The present invention relates to a tracking type laser gauge interferometer.

2. Description of the Related Art

Conventionally, a tracking type laser gauge interferometer is known which is comprised of a first recursive reflector provided at a predetermined position to reflect light parallel to incident light; a second recursive reflector attached to a measurement object; a main body part for guiding to the first recursive reflector light emitted from a laser light source and making emergent the light reflected at the first recursive reflector; a rotating mechanism for rotating the main body part about the first recursive reflector; and a control unit for controlling the rotating mechanism on the basis of the light emergent from the main body part and reflected at the second recursive reflector, so as to measure the distance between the recursive reflectors while tracking the second recursive reflector (e.g., refer to JP-A-7-120213).

The tracking type laser interferometer (tracking type laser gauge interferometer) described in JP-A-7-120213 has two cat's eyes (first recursive reflector and second recursive reflector), a rotating part (main body part), a supporting frame serving as the rotating mechanism, two motors, and the control unit, and measures the distance between the cat's eyes while tracking the cat's eye serving as the second recursive reflector. In addition, with the tracking type laser interferometer described in JP-A-7-120213, in the state in which the rotating mechanism is not rotating about the cat's eye serving as the first recursive reflector, the rotating portion is rotated by using as axes two axes which are perpendicular to the traveling direction of the light incident on this cat's eye. Accordingly, the tracking type laser interferometer described in JP-A-7-120213 is capable of calculating the position of a moving body on the basis of the rotational angle of the rotating mechanism and the distance between the cat's eyes.

However, since motion errors occur in the rotating mechanism, the tracking type laser interferometer described in JP-A-7-120213 has a problem in that it is unable to properly acquire the rotational angle of the rotating mechanism, and is hence unable to properly calculate the position of the moving object.

SUMMARY

An object of the present invention is to provide a tracking type laser gauge interferometer which is capable of properly acquiring the rotational angle of the rotating mechanism.

According to an aspect of the invention, there is provided a tracking type laser gauge interferometer including: a first recursive reflector provided at a predetermined position, the first recursive reflector being configured to reflect light parallel to incident light; a second recursive reflector attached to a measurement object; a main body part configured to guide light emitted from a laser light source to the first recursive reflector and make emergent the light reflected at the first recursive reflector; a rotating mechanism configured to rotate the main body part about the first recursive reflector; and a control unit configured to control the rotating mechanism on the basis of the light emergent from the main body part and reflected at the second recursive reflector, so as to measure the distance between the recursive reflectors while tracking the second recursive reflector, wherein: the main body part includes a light receiving element configured to receive the light reflected at the first recursive reflector and detect a position of the received light; and the control device includes: an angle acquisition unit configured to acquire a rotational angle of the rotating mechanism; and an correction unit configured to correct a motion error of the rotating mechanism.

Here, a recursive reflector, such as a spherical body having a refractive index 2, a retro-reflector, a cat's eye, causes the light incident toward its center to be reflected through the same optical path as that of the incident light, and causes the light, incident in an offset manner from the center to be reflected through a different route from that of the incident light. It should be noted that the center of the recursive reflector differs depending on the configuration of the recursive reflector, and in the case of, for example, the spherical body having a refractive index 2, the center of the recursive reflector is the center of the spherical body.

In addition, since the rotating mechanism causes its main body part to rotate about the center of the first recursive reflector, in cases where motion errors do not occur in the rotating mechanism, the light incident on the first recursive reflector is made incident toward the center of the first recursive reflector irrespective of the rotation of the main body part, and is reflected through the same optical path as that of the incident light. However, in cases where motion errors occur in the rotating mechanism, the light incident on the first recursive reflector is made incident in such manner as to be offset from the center of the recursive reflector, and is reflected through a different optical path from that of the incident light.

Therefore, according to the present invention, since the main body part has a light receiving element for receiving the light reflected at the first recursive reflector and detecting the position of the received light, the position of the light detected by the light receiving element does not undergo displacement in cases where motion errors do not occur in the rotating mechanism, and undergoes displacement in cases where motion errors occur in the rotating mechanism. Further, since the control device has the angle acquisition unit for acquiring the rotational angle of the rotating mechanism and the correction unit for correcting the motion error of the rotating mechanism acquired by the angle acquisition unit, it is possible to properly acquire the rotational angle of the rotating mechanism.

The control unit may include a position calculation unit configured to calculate a position of the second recursive reflector on the basis of the motion error of the rotating mechanism corrected by the angle correcting unit and a distance between the recursive reflectors.

According to the above-described configuration, since the control device has the position calculation unit for calculating the position of the second recursive reflector on the basis of the rotational angle of the rotating mechanism corrected by the correction unit, it is possible to properly calculate the position of the measurement object.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
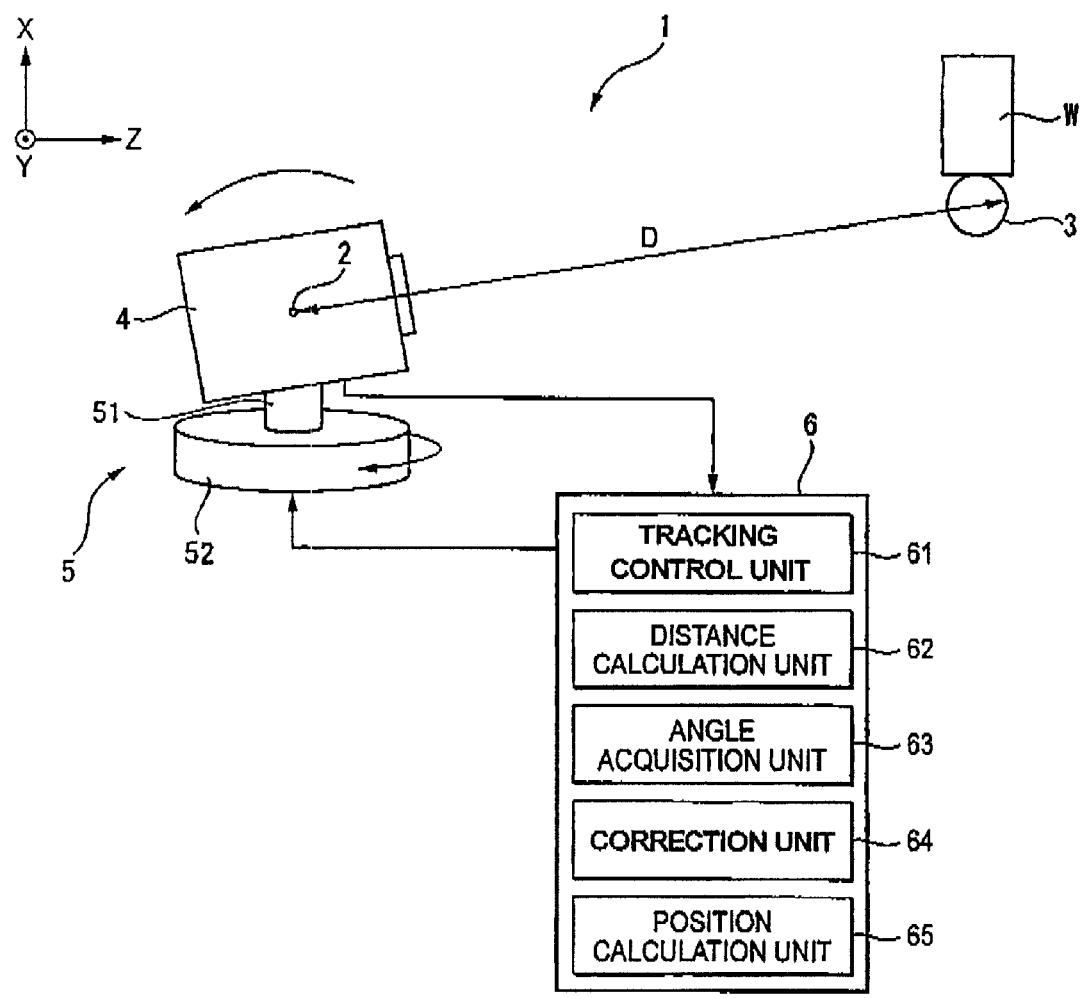
FIG. 1 is a schematic diagram illustrating a tracking type laser gauge interferometer in accordance with an embodiment of the present invention.

Hereafter, a description will be given of an embodiment of the present invention with reference to the accompanying drawings. FIG. 1 is a schematic diagram illustrating a tracking type laser gauge interferometer 1 in accordance with an embodiment of the present invention. As shown in FIG. 1, the tracking type laser gauge interferometer 1 is comprised of a measurement reference gage 2 serving a first recursive reflector provided at a predetermined position to reflect light parallel to incident light; a target 3 serving as a second recursive reflector attached to a measurement object W; a main body part 4 for guiding to the measurement reference gauge 2 light emitted from a laser light source LS (see FIG. 3) and making emergent the light reflected at the measurement reference gauge 2; a rotating mechanism 5 for rotating the main body part 4 about the measurement reference gauge 2; and a control device 6 for controlling the rotating mechanism 5 on the basis of the light emergent from the main body part 4 and reflected at the target 3.

This tracking type laser gauge interferometer 1 measures a distance D between the measurement reference gauge 2 and the target 3 while tracking the target 3. It should be noted that, in FIG. 1, it is assumed that in the state in which the rotating mechanism 5 is not rotating about the cat's eye serving as the first recursive reflector, the traveling direction (rightward direction in FIG. 1) of the light emergent from the main body part 4 is set as a +Z-axis direction, and two axes perpendicular to this Z-axis are respectively set as an X-axis and a Y-axis. The same also applies to the drawings that follow.

Figure 2:
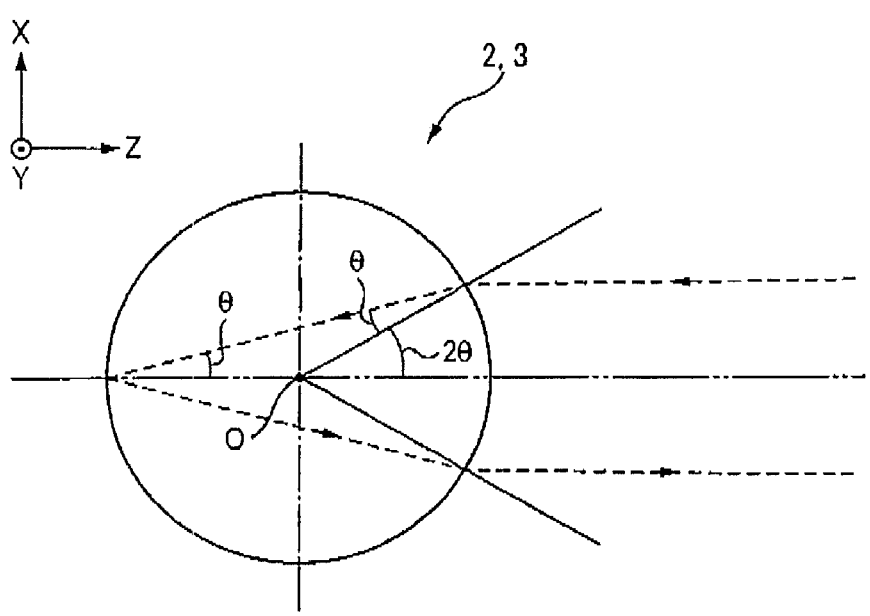
FIG. 2 is a diagram illustrating an example of each of the recursive reflectors which are used as a measurement reference gauge and a target in the embodiment.

FIG. 2 is a diagram illustrating an example of each of the recursive reflectors which are used as the measurement reference gauge 2 and the target 3. It should be noted that, in FIG. 2, the light incident on the recursive reflector and the light reflected at the recursive reflector are indicated by broken lines with arrows, and these arrows indicate the traveling direction of the light. As the measurement reference gauge 2 and the target 3, a spherical body having a refractive index 2 is used as the recursive reflector, as shown in FIG. 2. Each of the measurement reference gauge 2 and the target 3 causes the light incident toward a center O to be reflected through the same optical path (two-dot chain line in FIG. 2) as that of the incident light, and causes the light incident in an offset manner from the center to be reflected through a different route (broken line in FIG. 2) from that of the incident light.

Figure 3:
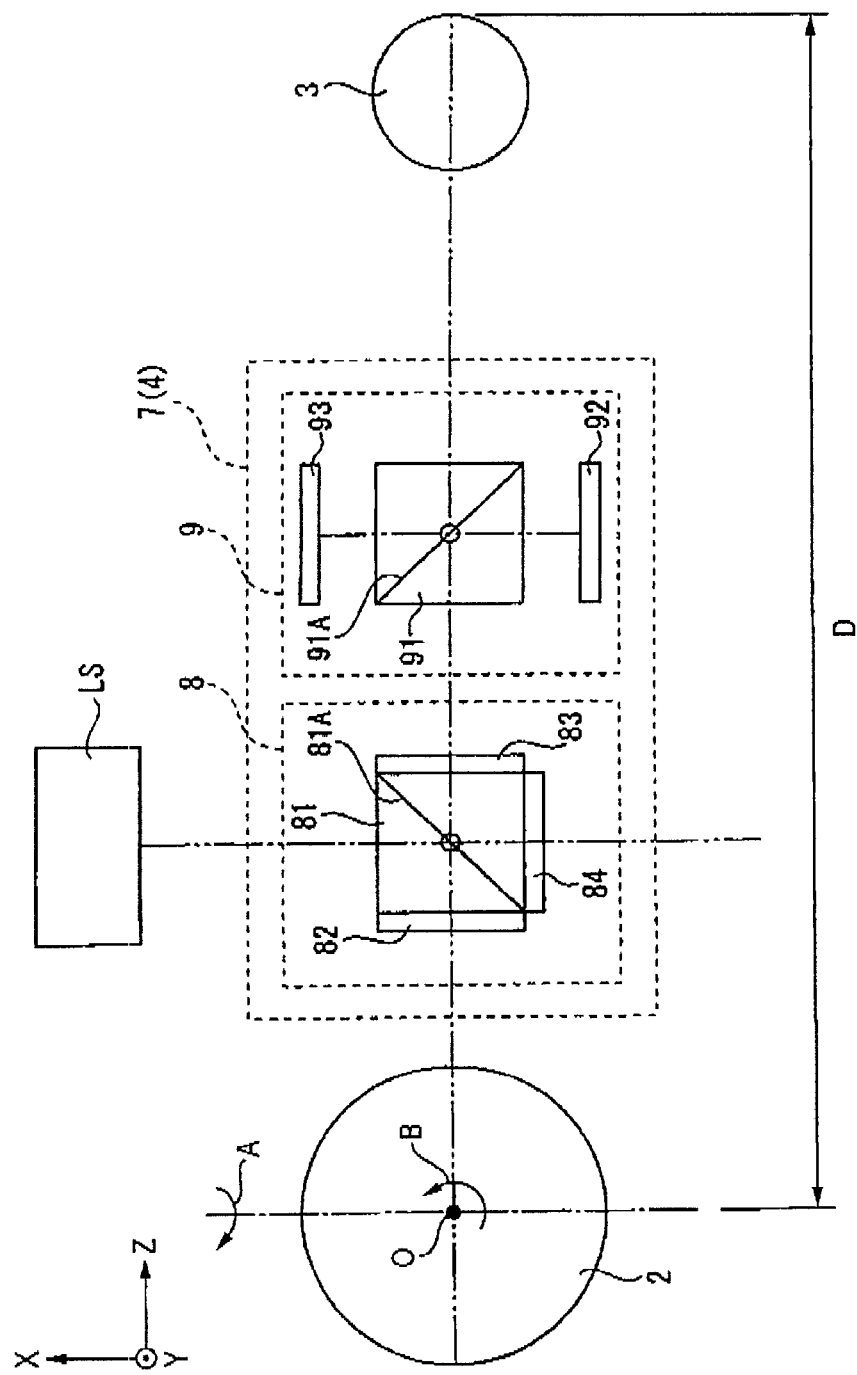
FIG. 3 is a schematic diagram illustrating an optical system disposed in a main body part in the embodiment.

FIG. 3 is a schematic diagram illustrating an optical system 7 disposed in the main body part 4. It should be noted that, in FIG. 3, the optical axis of the tracking type laser gauge interferometer 1 including the measurement reference gauge 2, the target, 3, and the optical system 7 is indicated by a two-dot chain line. As shown in FIG. 3, the main body part 4 has the optical system 7 which is disposed between the measurement reference gauge 2 and the target 3. The optical system 7 has an optical length measuring system 8 for guiding to the measurement reference gauge 2 the light emitted from the laser light source LS and for measuring the distance D between the measurement reference gauge 2 and the target 3 as well as an optical detection system 9 for detecting the light reflected at the measurement reference gauge 2 and the light emergent from the main body part 4 and reflected at the target 3.

The optical length measuring system 8 has a polarizing beam splitter 81 disposed in a latter stage of the optical path of the laser light source LS so as to split the light emitted from the laser light source LS; a quarter-wave plate 82 disposed between the polarizing beam splitter 81 and the measurement reference gauge 2 to retard the phase of the incident light by 90°; a quarter-wave plate 83 disposed between the polarizing beam splitter 81 and the optical detection system 9; and a polarizing plate 84 provided on a surface of the polarizing beam splitter 81 opposite to the laser light source LS side surface thereof. The polarizing beam splitter 81 has a polarizing splitting film 81A which allows p-polarized light to be transmitted therethrough and reflects s-polarized light. The polarizing plate 84 transmits therethrough only the light having a predetermined direction of polarization, and is disposed so as to allow the polarizing splitting film 81A to transmit the p-polarized and s-polarized light therethrough.

The optical detection system 9 has a beam splitter 91 disposed between the optical length measuring system 8 and the target 3, a two-dimensional position sensitive detector (PSD) 92 disposed on the opposite side to the laser light source LS side, and a two-dimensional PSD 93 disposed on the laser light source LS side. The beam splitter 91 reflects part of the incident light at its interface 91A and allows other portion to be transmitted therethrough. The two-dimensional PSDs 92 and 93 detect the position of the light which they receive, and the two-dimensional PSD 92 is disposed at a position for receiving the light: incident on the beam splitter 91 from the optical length measuring system 8 side and reflected at the interface 91A, while the two-dimensional PSD 93 is disposed at a position for receiving the light incident on the beam splitter 91 from the target 3 side and reflected at the interface 91A.

Next, a description will be given of the optical path of the light in the tracking type laser gauge interferometer 1. The light emitted from the laser light source LS is incident on the polarizing beam splitter 81. Of the light incident on the polarizing beam splitter 81, the s-polarized light is reflected at the polarizing splitting film 81A and is incident on the measurement reference gauge 2 (hereafter, this light will be referred to as measurement light). Meanwhile, the p-polarized light is transmitted through the polarizing splitting film 81A and is incident on the polarizing plate 84 (hereafter, this light will be referred to as reference light).

The measurement light incident on the measurement reference gauge 2 is reflected at the measurement reference gauge 2 and is again made incident on the polarizing beam splitter 81. At this time, since the measurement light has passed through the quarter-wave plate 82 twice, its direction of polarization is rotated 90°, so that it becomes p-polarized light with respect to the polarizing splitting film 81A. Accordingly, the measurement light incident again on the polarizing beam splitter 81 is transmitted through the polarizing splitting film 81A and is incident on the beam splitter 91. Part of the measurement light incident on the beam splitter 91 is reflected at the interface 91A and is received by the two-dimensional PSD 92. Meanwhile, other part of the light is transmitted through the interface 91A and is made emergent from the main body part 4. Namely, in this embodiment, a light receiving element is constituted by the two-dimensional PSD 92.

The measurement light emergent from the main body part 4 is reflected at the target 3, and is again made incident on the beam splitter 91. Part of the measurement light incident again on the beam splitter 91 is reflected at the interface 91A and is received by the two-dimensional PSD 93. Meanwhile, other part of the light is transmitted through the interface 91A and is again made incident on the polarizing beam splitter 81. At this time, since the measurement light has passed through the quarter-wave plate 83 twice, its direction of polarization is rotated 90°, so that it becomes s-polarized light with respect to the polarizing splitting film 81A. Accordingly, the measurement light incident again on the polarizing beam splitter 81 is reflected at the polarizing splitting film 81A and is incident on the polarizing plate 84. The measurement light and the reference light incident on the polarizing plate 84 then form interfering light, which is made emergent from the polarizing plate 84. It should be noted that the interfering light emergent from the polarizing plate 84 is received by a light receiving device (not shown).

As shown in FIG. 1, the rotating mechanism 5 has a supporting member 51 which has as its rotational axis (hereafter, a y-axis) an axis passing through the center O of the measurement reference gauge 2 (see FIG. 3) and parallel to the Y-axis, and which rotatably supports the main body part 4, as well as a table 52 which has as its rotational axis (hereafter, an x-axis) an axis passing through the center O of the measurement reference gauge 2 and parallel to the X-axis, and which rotatably supports the supporting member 51. It should be noted that the rotating mechanism 5 has an x-axis driving unit for rotating the supporting member 51 about the x-axis (arrow A in FIG. 3) and a y-axis driving unit for rotating the main body part 4 about the y-axis (arrow B in FIG. 3) (neither are shown). These driving units respectively drive the supporting member 51 and the main body part 4 under control by the control device 6. In addition, the rotating mechanism 5 has a sensor for detecting the rotational angle of the supporting member 51 about the x-axis and the rotational angle of the main body part 4 about the y-axis. Namely, in the state in which the rotating mechanism 5 is not rotating about the center O of the measurement reference gauge 2, the rotating mechanism 5 rotates the main body part 4 by using as its rotational axes two axes which are perpendicular to the traveling direction (-z-axis direction) of the light incident on the measurement reference gauge 2.

The control device 6 is configured by including a central processing unit (CPU), memory, and the like to control the tracking type laser gauge interferometer 1, and includes a tracking control unit 61, a distance calculation unit 62, an angle acquisition unit 63, an correction unit 64, and a position calculation unit 65. The tracking control unit 61 tracks the target 3 by controlling the rotating mechanism 5 on the basis of the light reflected from the target 3. Specifically, since the target 3 is a recursive reflector, when the target 3 moves in conjunction with the movement of the measurement object W, the position of the light reflected at the target 3 and detected by the two-dimensional PSD 93 undergoes displacement. Accordingly, by controlling the rotating mechanism 5 on the basis of the position of the light detected by the two-dimensional PSD 93, the tracking control unit 61 is able to control the traveling direction of the light emergent from the main body part 4 to thereby track the target 3.

The distance calculation unit 62 calculates the distance D between the measurement reference gauge 2 and the target 3 on the basis of the interfering light emergent from the polarizing plate 84 and received by the aforementioned light receiving device. The angle acquisition unit 63 acquires the rotational angles of the main body part 4 about the x- and y-axes, i.e., the rotational angles of the rotating mechanism 5, through the sensor of the rotating mechanism 5.

The correction unit 64 corrects the motion errors of the rotating mechanism 5 acquired by the angle acquisition unit 63, on the basis of the position of the light detected by the two-dimensional PSD 92. Specifically, since the measurement reference gauge 2 is a recursive reflector, when motion errors occur in the rotating mechanism 5, the position of the light detected by the two-dimensional PSD 92 undergoes displacement. Accordingly, the correction unit 64 is able to correct the motion errors of the rotating mechanism 5 acquired by the angle acquisition unit 63, on the basis of the position of the light detected by the two-dimensional PSD 92. The position calculation unit 65 calculates the position of the target 3 on the basis of the rotational angles of the rotating mechanism 5 corrected by the correction unit 64 and the distance D between the measurement reference gauge 2 and the target 3 calculated by the distance calculation unit 62.

According to the above-described embodiment, since the control device 6 has the angle acquisition unit 63 for acquiring the rotational angles of the rotating mechanism 5 and the correction unit 64 for correcting the motion errors of the rotating mechanism 5 acquired by the angle acquisition unit 63, it is possible to properly acquire the rotational angles of the rotating mechanism 5. Further, since the control device 6 has the position calculation unit 65 for calculating the position of the target 3 on the basis of the rotational angles of the rotating mechanism 5 corrected by the correction unit 64, it is possible to properly calculate the position of the measurement object W.

It should be noted that the present invention is not limited to the foregoing embodiment, and modifications, improvements, and the like within the scope in which the object of the present invention can be attained are included in the present invention. For example, in the above-described embodiment, the control device 6 has the position calculation unit 65 for calculating the position of the target 3. However, the control device may not have the position calculation unit. In short, the control device is sufficient if it has the angle acquisition unit and the correction unit. In the above-described embodiment, the light receiving element is constituted by the two-dimensional PSD 92. In contrast, the light receiving element may be constituted by a 4-split photodiode or the like. In short, the light receiving element is sufficient if it is able to detect the position of the received light.

Although in the above-described embodiment spherical bodies having the refractive index 2 are used as the first recursive reflector and the second recursive reflector, it is possible to use retro-reflectors, cat's eyes, or the like. In the above-describe embodiment, the rotating mechanism 5 is arranged such that its main body part 4 is rotated about two rotational axes, i.e., the x- and y-axes. In contrast, the rotating mechanism 5 may be arranged such that its main body part is rotated about one rotational axis or three or more rotational axes. In short, the rotating mechanism is sufficient if its main body part is rotated about the first recursive reflector.

The present invention can be suitably used as the tracking type laser gauge interferometer.

What is claimed is:
1. A tracking type laser gauge interferometer comprising:
a first recursive reflector provided at a predetermined position, the first recursive reflector being configured to reflect light parallel to incident light;
a second recursive reflector attached to a measurement object;
a main body part configured to guide light emitted from a laser light source to the first recursive reflector and make emergent the light reflected at the first recursive reflector;
a rotating mechanism configured to rotate the main body part about the first recursive reflector;

a sensor configured to detect a rotational angle of the rotating mechanism; and a control unit configured to control the rotating mechanism based on the light emergent from the main body part and reflected at the second recursive reflector, so as to measure the distance between the recursive reflectors while tracking the second recursive reflector, wherein:

the main body part includes:

a light receiving element configured to receive the light reflected at the first recursive reflector and detect a position of the received light; and the control unit includes:

an angle acquisition unit configured to acquire the rotational angle of the rotating mechanism from the sensor;

a correction unit configured to correct the rotational angle of the rotating mechanism acquired by the angle acquisition unit on the basis of the position of the received light detected by the light receiving element; and a position calculation unit configured to calculate a position of the second recursive reflector based on the corrected rotational angle of the rotating mechanism corrected by the angle correcting unit and a distance between the recursive reflectors.

2. The tracking type laser gauge interferometer according to claim 1, wherein the main body part includes:

an optical length measuring system configured to guide the light emitted from the laser light source to the first recursive reflector and make emergent the light reflected at the first recursive reflector; and an optical detection system comprising the light receiving element configured to receive the light reflected at the first recursive reflector and the light reflected at the second recursive reflector.

3. The tracking type laser gauge interferometer according to claim 1, wherein the rotating mechanism includes:

a supporting member configured to rotatably support the main body part about a first axis; and a table configured to rotatably support the supporting member about a second axis; and the sensor is configured to detect rotational angles of the rotating mechanism about the first and second axes.

4. The tracking type laser gauge interferometer according to claim 3, wherein the correction unit is configured to correct the rotational angles about the first and second axes of the rotating mechanism on the basis of the position of the received light detected by the light receiving element.

5. The tracking type laser gauge interferometer according to claim 4, wherein the position calculation unit is configured to calculate the position of the second recursive reflector based on the corrected rotational angles about the first and second axes of the rotating mechanism corrected by the angle correcting unit and a distance between the recursive reflectors.

* * * * *